United States Patent [19]
Lofgren

[11] 3,708,412
[45] Jan. 2, 1973

[54] ELECTROCHEMICAL CELL WITH COMPOSITE ELECTRODE-MEMBRANE

[75] Inventor: Harold C. Lofgren, Minneapolis, Minn.

[73] Assignee: Honeywell Inc., Minneapolis, Minn.

[22] Filed: Oct. 13, 1071

[21] Appl. No.: 188,923

[52] U.S. Cl.............................................204/195 P
[51] Int. Cl..............................................G01n 27/46
[58] Field of Search...........................204/195 P, 1 T

[56] References Cited

UNITED STATES PATENTS

| | | | |
|---|---|---|---|
| 3,001,918 | 9/1961 | Czuha | 204/195 W |
| 3,098,813 | 7/1963 | Beebe et al. | 204/195 P |
| 3,410,778 | 11/1968 | Krasberg | 204/195 P |
| 3,503,861 | 3/1970 | Volpe | 204/195 P |
| 3,574,078 | 4/1971 | Hynes et al. | 204/195 P |
| 3,655,546 | 4/1972 | Marovich et al. | 204/195 P |

*Primary Examiner*—T. Tung
*Attorney*—Lamont B. Koontz

[57] ABSTRACT

A composite laminated electrode diffusion medium for use with electrochemical cells, particularly of the type used to detect the proportionate amount of a gas in a fluid medium, includes an intermediate barrier membrane member of a gas permeable, non-conducting material flanked in sandwich fashion by gas permeable, non-conducting carrier membrane layers, wherein the outer layer carries a metal screen blocking member which reduces the amount of sample gas diffusing through the membrane and the inner layer carries the sensing electrode.

10 Claims, 4 Drawing Figures

INVENTOR.
HAROLD C. LOFGREN

BY *Torson B. Koog*

ATTORNEY.

ELECTROCHEMICAL CELL WITH COMPOSITE ELECTRODE-MEMBRANE

BACKGROUND OF THE INVENTION

1. Field of the Invention

The present invention relates broadly to the improvement of electrochemical cells, especially those of the type used to determine the proportionate amounts of a gas or gases dissolved in a liquid or carried by another gas or vapor. More particularly, the invention is concerned with an improved composite diffusion medium for such cells which controllably reduces the amount of gases diffusing therethrough into the cell thereby enabling the cell to have a longer useful life in the presence of certain gases.

2. Description of the Prior Art

Electrochemical cells of the type involved may be constructed either as galvanic or polarographic in nature. In the former the electrode and electrolyte species are selected such that when the measuring electrode is exposed to the electroactive species sought to be determined, the resulting reaction causes a current to flow in the system which is a function of the amount of such electroactive species present. No external voltage is required to make the system operate. In the latter type cell a predetermined external voltage is impressed across the electrodes which, in the absence of the electroactive species sought to be determined, polarizes the system reducing the cell current substantially to zero. When the measuring or polarizing electrode is thereafter exposed to the electroactive species, a current again flows which is a function of the concentration of the electroactive species sought to be determined in the gas stream analyzed.

Gas detecting cells generally include an electrolyte, a measuring or polarizing electrode (cathode) and a reference electrode (anode). In gas detecting cells of this nature, normally the electroactive surface of the detector is separated from the external environment by a semi-permeable membrane. The gas molecules of the external environment diffuse through the membrane to react at the electroactive surface of the cathode, thereby producing a signal in the form of an electrical current having a level which is directly proportional to the reaction rate and thus, to the concentration of electroactive molecules in the external environment. Specificity regarding the molecular species to be sensed by the detector is achieved by selecting the proper combination of semi-permeable membrane, cathode surface material, electrode potential, electrolyte and reference electrode. Typically, in polarographic cells of this type, for example, which have found wide use in oxygen determinations, such as sensing, measuring and analyzing, a reference electrode of silver-silver chloride, a polarizing electrode of gold or platinum and an electrolyte consisting of an aqueous solution of potassium chloride are provided.

In earlier prior art oxygen sensors, typical examples of which are disclosed in U.S. Pats. No. 2,913,386 and No. 3,000,805, cell construction included the use of separate membrane and cathode with the space therebetween filled with an appropriate electrolyte. Because changes in the relative positions of the membrane and the electrode affect the ability of cell response by producing fluctuations in the amount of undesirable background or noise reactions which occur simultaneously with the reaction being monitored, any movement or change in tension of the membrane relative to the electrode is found to be quite undesirable. More recently, cells utilizing a composite electrode-diffusion medium having an electrode body carried by the semi-permeable membrane have been developed which eliminate the aforementioned problem. Examples of these are illustrated and described in United States Pats. No. 3,510,420 and No. 3,574,078 which are assigned to the same assignee as the present invention.

While the improvements contained in the latter type cell construction obviate the cell response problems associated with the prior devices, all of these devices still suffer from the drawback of having a severely limited useful life when exposed to a medium containing high concentrations of the species of molecules sought to be detected. Thus, while such devices can be successfully operated at low oxygen concentrations, when exposed to an atmosphere containing a high percentage of oxygen, such cells fail quite rapidly due to the greatly increased electroactivity produced.

SUMMARY OF THE INVENTION

According to the present invention, there is provided a unique composite electrode-diffusion membrane which greatly enhances the useful life and range of application of detection cells of the type described by overcoming the difficulties associated with the exposure of such cells to high concentrations of the electroactive molecular species sought to be detected. A layer of material which retards the diffusion of gaseous molecular species is laminated between membranes of gas permeable, non-conducting material and an additional gas permeable non-conducting membrane carrying a metallic cathode forms the final laminate layer on the inwardly directed side of the composite membrane. Because proportionately fewer molecules of the electroactive species are able to reach the electrode per unit time through the composite membrane of the present invention owing to the retarding properties of the additional laminate layer, electrolytic detecting cells utilizing the membrane of the present invention show a markedly longer useful life.

BRIEF DESCRIPTION OF THE DRAWINGS

In the drawings, wherein like numerals are used to designate like parts throughout the same.

DESCRIPTION OF THE PREFERRED EMBODIMENT

It should be noted that although the preferred embodiment illustrated and described herein is directed to the detection of oxygen as the electroactive species in a liquid or a gas, the invention is readily adaptable to the detection of other gases. Thus, other reactive gases such as chlorine, bromine, sulfur dioxide, etc., in a variety of environments can be determined by cells using the present invention.

Figure 1:
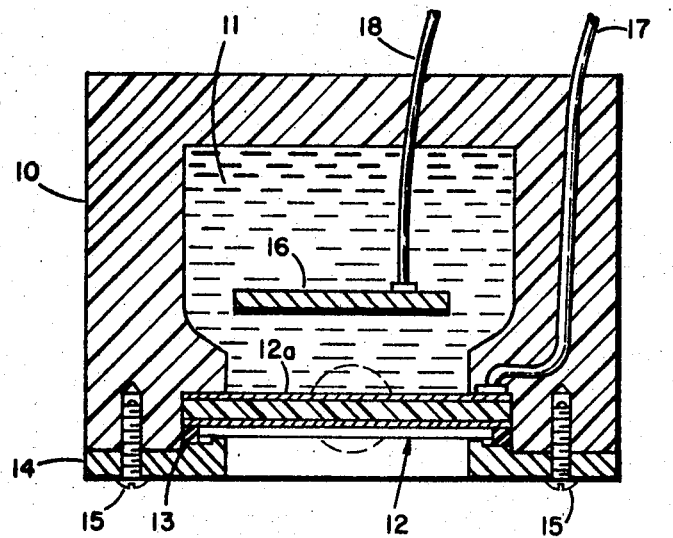
FIG. 1 is a schematic representation of a vertical sectional view through an electrochemical cell utilizing the membrane of the invention.

Turning now to the drawings and, in particular, to FIG. 1 thereof, there is illustrated an electrochemical cell for determining the concentration of oxygen in a liquid or gas. The cell comprises a hollow, generally cylindrical body 10 which defines an inner chamber 11 containing the electrolyte, which may be an aqueous solution of an alkali metal sulfide or other suitable electrolyte. The lower end of the body 10 is provided with an opening which communicates with the inner chamber 11 and the electrolyte contained therein. The laminated composite electrode-diffusion medium 12 of the invention is disposed across the opening defining a barrier between external environment and the inner chamber 11. A liquid tight seal is provided about the periphery of the membrane by conventional means which may include an O-ring 13 held in a sealing position by a retainer ring 14 fastened by screws 15. While the membrane 12 is impervious to the passage of the liquid electrolyte from the cell thereby completing a liquid tight seal, it is oxygen permeable and, as such, does allow the passage of oxygen from the external environment into the cell. Another electrode 16 which may be of any metal anode material compatible with the electrolyte (typically a copper-copper sulfide electrode is used in an alkali-metal sulfide electrolyte) is located in the chamber 11 spaced a small distance from the inner surface of the membrane 12. As will be discussed below in greater detail, the innermost member 12a of the composite membrane 12 which is exposed to the electrolyte as shown comprises the second electrode in the cell system. Electrical leads 17 and 18 connect the respective electrodes 12a and 16 to the desired external circuitry.

Figure 2B:
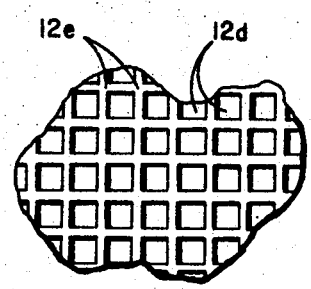
FIG. 2B is a horizontal sectional view showing the details of the blocking layer.
Figure 2A:
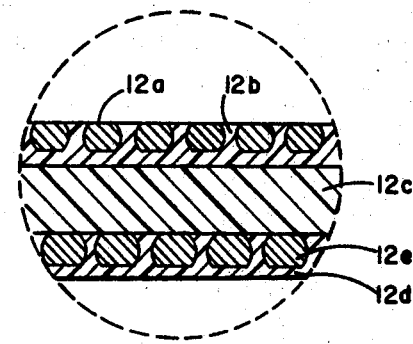
FIG. 2A is an enlarged fragmentary view of the composite structure within the circle designated in FIG. 1.

The diffusion medium 12, shown generally in FIG. 1 is depicted in greater laminar detail in FIG. 2A. Thus, in accordance with the preferred embodiment of the present invention, a cathode 12a, which may be of normal density noble metal mesh or screen such as gold, for example, is carried by a non-conducting carrier layer 12b as by pressing the electrode into the surface of that layer. The carrier layer 12b is, in turn, bonded to a chemically inert non-conducting, gas permeable barrier layer 12c. Beyond the barrier layer 12c and bonded thereto is an additional carrier layer 12d which, in a manner similar to that of carrier layer 12b, carries an additional member 12e which retards the diffusion of gas molecules through the membrane.

An important aspect of the present invention relates to the discovery that a layer of gas impervious material such as a metal screen or a perforated metal plate laminated into the membrane structure successfully retards the diffusion of gas molecules through the membrane by an amount related to the percentage of the open area which is blocked by the blocking member in a manner which produces very little increased delay in the response time of the cell. This occurs because those molecules which do diffuse through the membrane are, for the most part, molecules which diffuse directly through the openings in the blocking member. The molecules striking the solid portions of the blocking layer, of course, are deflected from their path of penetration through the membrane, thus reducing the total amount of gas molecules which diffuse into the cell under given conditions during a given span of time. Because the number of molecules of the particular electroactive species sought to be detected and measured by the cell (in the case of the preferred embodiment of the invention, oxygen) which diffuse through the membrane is related to the concentration of that species in the gaseous medium to which the membrane is exposed, the total number of molecules of that species which diffuse through the membrane under a given set of conditions during a given time span is similarly reduced. Thus, it can readily be seen that the electroactivity of the cell is reduced by an amount related to the density of the blocking member as such electroactivity is directly related to the amount per unit time of the electroactive species reaching the cathode member of the cell. The ability of a cell constructed in accordance with the present invention to operate at reduced electro-activity in a given environment greatly increases the useful life of such a cell and renders it suitable for exposure to mediums containing high concentrations of oxygen for long periods of time without cell failure.

It should be noted that other methods of decreasing the diffusion rate of oxygen through the membrane, such as increasing the thickness of the barrier layer 12c, have the very serious drawback that they greatly lengthen the response time of the device because they slow down the diffusion velocity of all of the molecules diffusing through the membrane and thereby render the device unsuitable for use in many applications where the response time may be critical.

In regard to the proper selection of the metal blocking member 12e generally, the percentage of open area is not critical and may be varied for a particular application of the cell involved. Thus, as the percentage of open area of the blocking member 12e is decreased, the rate of oxygen diffusion through the membrane is proportionately decreased and this in turn decreases the electroactivity of the cell in response to an environment having a given percentage of oxygen. This decrease in electroactivity, of course, results in the corresponding decrease in the signal produced by the cell which must be monitored for a cell readout. Thus, while it is desirable to decrease the rate of oxygen diffusion through the composite membrane as much as possible to increase the useful life span of the cell, the permeability of the blocking member 12e must be kept at a level sufficient to produce a cell signal which may be accurately monitored throughout the desired oxygen concentration range for which the particular cell is to be used.

In accordance with the preferred embodiment of the present invention, it has been found that a uniform metal screen having about 20 percent open area can be employed quite successfully to produce cells which effectively monitor oxygen concentrations in the range from about 20 to 100 percent at one atmosphere pressure and with a useful life of many months. Thus, one highly successful membrane has been constructed utilizing a screen of electroformed gold having about 200 to 500 lines per inch and a thickness of from 0.3 to 0.6 mils. Of course, the width of the metal lines and the width of the space therebetween in an electroformed screen is established by the dimensions of the lines on the master plate upon which the screen is formed, and on the thickness of the metal deposited on the plate or free-plated onto the screen after formation. Thus, screens can be made with the same number of lines per inch yet vary widely in the percentage of open area involved. In accordance with the preferred embodiment of the present invention, however, the finer the mesh the more desirable it is from the standpoint that it allows a more uniform diffusion through the membrane. Electroformed screens of the type described are readily available from several manufacturers including the Buckbee Mears Company of St. Paul, Minnesota.

The particular metal used to form the screen of the invention is not critical and any suitable metal that is commonly known in the art may be used, however, the noble metals are preferred since they do not tend to corrode. Gold is used in the preferred embodiment inasmuch as it corresponds to the metal comprising the electrode member 12a, described in greater detail below, thereby preventing the possibility of any extraneous current being developed in the cell caused by electromotive differences should electrical contact be established between the members 12e and 12a for any reason.

It should also be noted that while the preferred embodiment is described as utilizing a screen member as the blocking member 12e, any such body capable of allowing uniform diffusion such as a perforated plate, for example, can be used.

It should also be appreciated that other materials which are susceptible of being formed into uniform barrier members, are compatible with the other membrane materials and resist corrosion can also be used to form the blocking layer. Thus, woven glass fibers, for example, can readily be substituted for the metal of the preferred embodiment.

Insofar as the materials comprising the two carrier layers 12b and 12d and the barrier layer 12c are concerned, they should be constructed of chemically inert, dielectric materials which are permeable to the oxidizing gas sought to be detected but impervious to the passage of liquid therethrough. To facilitate the actual construction of the membrane, as will be described below in greater detail, the carrier layers 12b and 12d should be of a relatively low softening point material capable of bonding to or fusing with the barrier layer material which should be of a relatively high softening point material. The carrier layers 12b and 12d, of course, support and position the respective mesh members 12a and 12e carried therein and fix them in permanent relationship with respect to the barrier layer. The barrier layer provides a uniform diffusion resistance path which operates in conjunction with the blocking layer 12e to produce a highly controlled rate of diffusion through the membrane.

Figure 3:
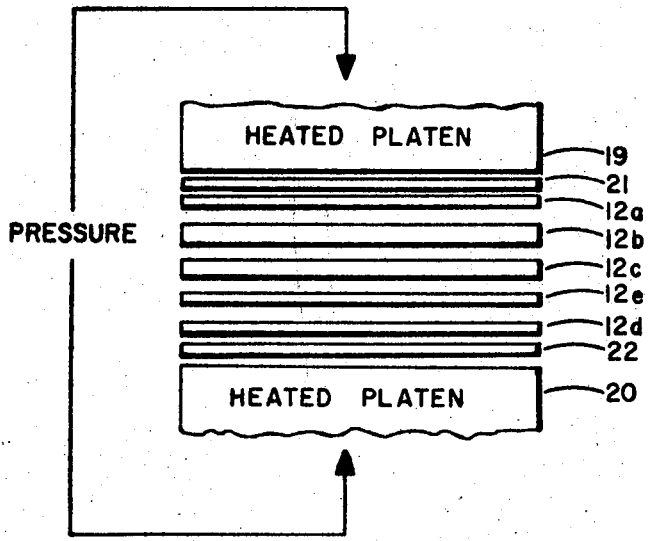
FIG. 3 is a schematic illustration of a method for preparing the laminated composite of the invention.

Turning now to FIG. 3, there is illustrated a particular composite laminated membrane structure along with a preferred method of producing that structure. Thus, in one representative embodiment of the membrane of the invention, the inner layer 12a of the composite laminated structure which functions as the cathode in the cellular electrode system is a section of 333 mesh gold screen having a thickness of between about 0.2 to about 0.3 mils thick. That number is in turn carried by the inner carrier layer 12b which is a film of fluorinated ethylene-propylene copolymer having an overall thickness of from 0.4 to 0.5 mils (such as 0.5 mil FEP type A, manufactured by the DuPont Corporation, Wilmington, Del.). In similar fashion, the gold mesh blocking layer 12e is cut to a size from a section of 333 mesh gold screen having a thickness of between about 0.4 to about 0.5 mils thick and is also carried by a film of fluorinated ethylene-propylene copolymer having a film thickness of about 0.5 mil. The barrier layer 12c generally consists of a film of tetrafluoroethylene polymer (such as 1 mil Emflon, UTF–100, manufactured by Pallflex Products Corporation of Putnam, Conneticut) and is carried in sandwich fashion between the aforementioned carrier layers 12b and 12d with the adjacent surfaces bonded together.

One method of preparing the composite laminated membrane, as illustrated in FIG. 3, includes placing the layers 12a through 12e in the required order between two heated platens of a press (not shown) and separated physically therefrom by aluminum foil slip sheets 21 and 22 in a die (also not shown) in forming the laminated structure by the application of appropriate amounts of a pressure and heat thereto. One successful method that has been employed includes subjecting the prepared layers to a pressure of about 380 p.s.i. at a temperature of about 520° F for a period of about one minute. The laminated composite thus produced is then allowed to cool to a temperature below 400° F under pressure before removal from the press. The compressed composite laminar structure is then removed from between the platens of the press and the aluminum foil strip sheets are etched away by conventional methods, as with a solution of sodium hydroxide, and the membrance may thereafter be cleaned with nitric acid, washed and dried to complete its preparation for use in a cell of the type described. The lower softening points associated with the two carrier layers 12b and 12d allows a strong permanent bond to be formed with the barrier layer 12c without distorting that layer while, at the same time, allowing the respective gold mesh layers 12a and 12e to be uniformly pressed into the respective carrier layers.

In constructing the membrane of the invention, it is important to make sure that the gold mesh blocking layer 12e is electrically insulated from the conducting gold mesh cathode 12a so that it may properly perform its sole function as a diffusion retarding layer. This may be accomplished by making the layer 12b slightly smaller in dimensions than the remainder of the membrance to insure that no electrical contact can exist between the edges of the member 12a and the member 12e.

Insofar as the electrode layer 12a is concerned, any metal satisfactory for such purpose can be used, however, the noble metals are preferred because of their ability to resist corrosion. It is also possible to substitute a perforated plate or other type structure for the mesh described, however, a mesh provides the maximum, most uniform contact area with the electrolyte and these desirable properties are enhanced if the fineness of the mesh is increased.

While the particular temperature, pressure and time described in the pressing step are preferred for those materials enumerated in the lamination, those parameters will vary depending on the particular materials used for the carrier layer and the barrier layer. Thus, any combination of temperature, pressure and time which allows the flanking carrier layers to be intimately bonded to the barrier layer without softening the barrier layer to the extent that it allows any intermingling of the layers will be satisfactory.

Some additional specific examples of barrier-carrier layer combinations offered for the purpose of depicting other successful combinations which can be used in connection with the present invention are tabulated below.

| Barrier layer | Carrier layers |
| --- | --- |
| High melting point or relatively high density polyethylene e.g., 260°F. type. | Low melting point or relatively low density polyethylene e.g., 230°F. type. |
| High melting point or relatively high density polypropylene, e.g. 260°F. type. | Low melting point or relatively low density polypropylene e.g. 200°F. type. |
| Fluorinated ethylene-propylene copolymer. | High melting point or high density polyethylene, e.g. 260°F. type. |
| Do | Low melting point or low density polyethylene, e.g. 230°F. type. |
| Tetrafluoroethylene polymer | High melting point or high density polyethylene, e.g. 260° type. |
| Do | Low melting point or low density polyethylene, e.g. 230°F. type. |
| Fluorinated ethylene-propylene copolymer. | High melting point or high density polypropylene, e.g. 260°F. type. |
| Do | Low melting point or low density polypropylene, e.g. 200 °F. type. |
| Tetrafluoroethylene polymer | High melting point or high density polypropylene, e.g. 260°F. type. |
| Do | Low melting point or low density polypropylene, e.g. 200°F. type. |

As indicated above, the novel construction of the laminated composite membrane of the invention has facilitated the production of oxygen sensing cells with a greatly increased useful life when exposed to mediums containing relatively high oxygen concentrations. Thus, when cells of the type found in the prior art are exposed to mediums containing a high percentage of oxygen, the sensitivity of such cells is seen to deplete in a matter of a few days to the point where they are no longer useful. Cells constructed utilizing the composite laminar membrane of the present invention, on the other hands, have the ability to operate for many months at high oxygen concentrations.

The embodiments of the invention in which an exclusive property or right is claimed are defined as follows:

1. In an electrochemical cell adapted to be used in the determination of the concentration of a gas dispersed in a fluid comprising
   a first body defining a chamber with an opening across at least a portion of one surface of the chamber;
   a reference electrode contained within said chamber in gas-tight isolation, other than by said opening, from the environment external to said chamber;
   an electrolyte solution in said chamber in communication with said reference electrode and said opening;
   the improvement comprising a gas permeable composite electrode-membrane member in generally sheet form in liquid-tight engagement with said opening in said chamber, said composite membrane comprising three zones, an outer zone including a gas-permeable, non-conducting membrane member having a diffusion-retarding, blocking member laminated into the inwardly directed surface of said membrane, said blocking member comprising a gas-impervious material in a form which reduces the area for gas transmission therethrough by a predetermined amount, an inner zone comprising a gas-permeable, non-conducting membrane member carrying a metal measuring electrode member embedded in the inwardly directed surface thereof thereby exposing said electrode to the interior of said chamber and in communication with said electrolyte, and a central zone comprising a further gas-permeable, non-conducting membrane member laminated in sandwich fashion between said outer and inner zones.

2. An electrochemical cell as claimed in claim 1, wherein said non-conducting membrane members are plastic.

3. An electrochemical cell as claimed in claim 2, wherein said member comprising said central zone has a higher melting point than said non-conductive members of said outer and inner zones.

4. An electrochemical cell as claimed in claim 1, wherein said non-conducting membrane member of said outer zone and said non-conducting membrane member of said inner zone are fluorinated ethylene-propylene and said non-conductive membrane member in said central zone is a polytetrafluoroethylene.

5. An electrochemical cell as claimed in claim 1, wherein said blocking member is metal.

6. An electrochemical cell as claimed in claim 5, wherein said metal blocking member is in the form of a uniformly perforated plate.

7. An electrochemical cell as claimed in claim 5, wherein said metal blocking member is in the form of a uniform screen.

8. An electrochemical cell as claimed in claim 7, wherein said screen is electroformed gold having from 200 to 500 lines per inch and a thickness of from 0.0003 to 0.0006 inch.

9. An electrochemical cell as claimed in claim 7, wherein said screen comprises about 20 percent open area.

10. An electrochemical cell as claimed in claim 1, wherein the measuring electrode member embedded in said membrane member of said inner zone is a noble metal in the form of a mesh.

* * * * *